United States Patent
Deu-Ngoc et al.

(10) Patent No.: US 8,611,242 B2
(45) Date of Patent: Dec. 17, 2013

(54) METHOD AND SYSTEM FOR MONITORING USE OF A MOBILE HOTSPOT FUNCTION IN A WIRELESS DEVICE

(75) Inventors: Joseph Tu-Long Deu-Ngoc, Maryhill (CA); Jeremy Thompson, Waterloo (CA); Scott Peter Gammon, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 344 days.

(21) Appl. No.: 13/046,979

(22) Filed: Mar. 14, 2011

(65) Prior Publication Data
US 2012/0236733 A1 Sep. 20, 2012

(51) Int. Cl.
*H04L 12/26* (2006.01)
*H04L 12/28* (2006.01)
*H04W 4/00* (2009.01)

(52) U.S. Cl.
USPC ............ 370/252; 370/328; 370/389; 370/401

(58) Field of Classification Search
USPC .................................. 370/252, 328, 389, 401
See application file for complete search history.

(56) References Cited

U.S. PATENT DOCUMENTS

| 7,382,771 | B2 | 6/2008 | Leblanc et al. | |
|---|---|---|---|---|
| 2004/0179512 | A1 | 9/2004 | Leblanc et al. | |
| 2007/0113269 | A1 | 5/2007 | Zhang | |
| 2007/0127456 | A1* | 6/2007 | Lindemann et al. | 370/389 |
| 2008/0049779 | A1* | 2/2008 | Hopmann et al. | 370/431 |
| 2009/0170557 | A1 | 7/2009 | Chauhan et al. | |
| 2009/0323632 | A1 | 12/2009 | Nix | |
| 2010/0014415 | A1 | 1/2010 | Moeller | |
| 2010/0014459 | A1* | 1/2010 | Mir et al. | 370/328 |
| 2012/0023243 | A1* | 1/2012 | Xu | 709/228 |
| 2012/0026992 | A1* | 2/2012 | Navda et al. | 370/338 |
| 2012/0120799 | A1* | 5/2012 | Brisebois et al. | 370/231 |
| 2012/0124196 | A1* | 5/2012 | Brisebois et al. | 709/224 |
| 2012/0173635 | A1* | 7/2012 | Wormald et al. | 709/206 |
| 2012/0297341 | A1* | 11/2012 | Glazer et al. | 715/810 |

FOREIGN PATENT DOCUMENTS

GB 2 407 729 A 5/2005

OTHER PUBLICATIONS

IETF RFC 2663, "IP Network Address Translator (NAT) Terminology and Consideration", Aug. 1999, 1-32.*
IETF RFC 1631, "The IP network Address Translator (NAT)", May 1994, 1-12.*
European Patent Office, Extended European Search Report for European Patent Application No. EP 11158133.6, Jul. 15, 2011.
Egevant, K, et al., "The IP Network Address Translator (NAT)", Network Working Group, Request for Comments 1631, Internet Engineering Task Force, May 1994.
Srisuresh, P., et al., "IP Network Address Translator (NAT) Terminology and Considerations", Network Working Group, RFC 2663, Internet Engineering Task Force, Aug. 1999.

* cited by examiner

*Primary Examiner* — Andrew Lai
*Assistant Examiner* — Albert Shih
(74) *Attorney, Agent, or Firm* — McCarthy Tétrault LP (57) ABSTRACT

A method for monitoring use of a mobile hotspot function in a wireless device, comprising: storing a last access time for a client within a memory of the wireless device, the last access time being a time when the hotspot function last performed a network address translation for the client; determining whether a difference between a current time and the last access time exceeds a threshold; and, if the difference exceeds the threshold, generating an indication that the mobile hotspot function is not in use by the client.

22 Claims, 6 Drawing Sheets

METHOD AND SYSTEM FOR MONITORING USE OF A MOBILE HOTSPOT FUNCTION IN A WIRELESS DEVICE

FIELD OF THE APPLICATION

This application relates to the field of wireless devices, and more specifically, to a method and system for monitoring use of a mobile hotspot function in a wireless device.

BACKGROUND

Current wireless mobile communication devices include microprocessors, memory, soundcards, speakers, headphones, and run one or more software applications in addition to providing for voice communications. Examples of software applications used in these wireless devices include browsers, address books, email, instant messaging ("IM"), and mobile hotspot functions. Additionally, wireless devices have access to a plurality of services via the Internet. A wireless device may, for example, be used to browse web sites on the Internet, to transmit and receive graphics, and to execute streaming audio and/or video applications. Such wireless devices may operate on a cellular network, on a wireless local area network ("WLAN"), or on both of these types of networks.

One problem with current wireless devices pertains to their operation as mobile hotspots. When a wireless device is operating as a mobile hotspot, the end-to-end connectivity over the two radio technologies (e.g., Wi-Fi and CDMA, Wi-Fi and 3GPP, etc.) bridged by the mobile hotspot may need to be monitored in order to display an indication to the user of the wireless device or manage the operation of the mobile hotspot function. Since the two radio technologies are separate, it is often cumbersome and inaccurate to monitor both radio systems simultaneously to determine whether the mobile hotspot function is idle or in use.

A need therefore exists for an improved method and system for monitoring use of a mobile hotspot function in a wireless device. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain software, circuits, structures and techniques have not been described or shown in detail in order not to obscure the application. Example embodiments may be implemented in any computer programming language provided that the operating system of the device (e.g., wireless device, data processing system, etc.) provides the facilities that may support the requirements of the application. Any limitations presented would be a result of a particular type of operating system or computer programming language and would not be a limitation of the present application. Example embodiments of the present application may also be implemented in hardware or in a combination of hardware and software.

According to one example embodiment of the application, there is provided a method for monitoring use of a mobile hotspot function in a wireless device, comprising: using a processor, storing a last access time as an entry in a row for a client in a network address translation table within a memory of the wireless device, the last access time being a time when the row was last accessed by the mobile hotspot function to perform a network address translation for the client; determining whether a difference between a current time and the last access time exceeds a threshold; and, if the difference exceeds the threshold, generating an indication that the mobile hotspot function is not in use by the client.

Figure 1:
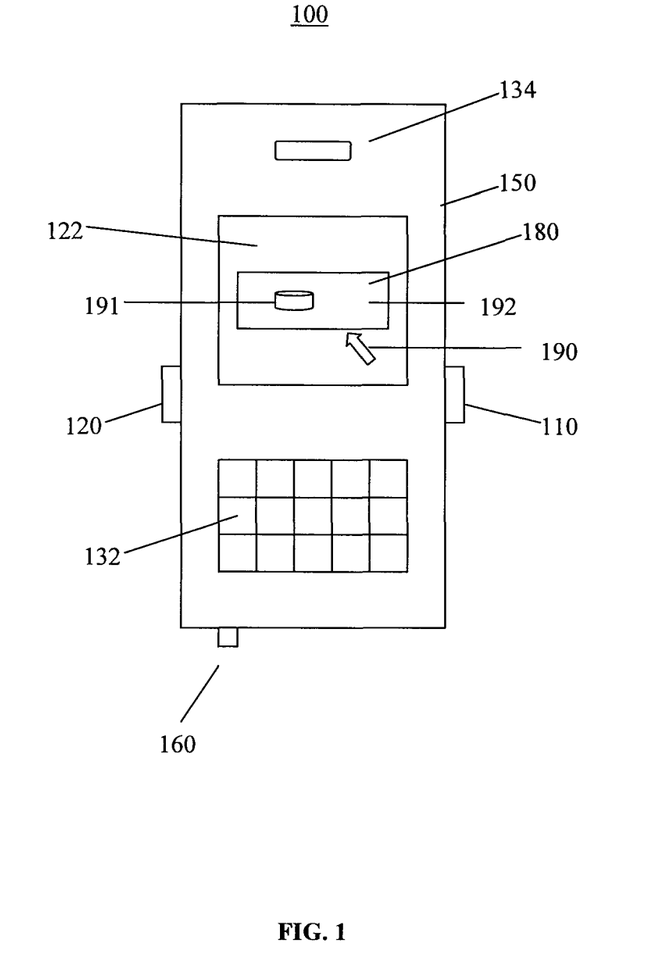
FIG. 1 is a front view illustrating a wireless device in accordance with an embodiment of the application.

FIG. 1 is a front view illustrating a wireless device 100 in accordance with an embodiment of the application. The wireless device 100 may include a cover or case 150, a display (e.g., a liquid crystal display ("LCD")) 122, a graphical user interface ("GUI") 180 displayed on the display 122, a speaker 134, a keyboard (or keypad) 132, a trackball or thumbwheel 110, various select buttons 120, and various inputs/outputs (e.g., power connector jack, data interface ports, headphones jack, etc.) 160. Internally, the wireless device 100 may include a central processing unit ("CPU"), processor, or microprocessor 138, memory 124, 126, 200, a battery 156, at least one antenna, etc., which are operatively coupled to the various inputs/outputs 160, the keyboard 132, the display 122, the speaker 134, etc., as will be described below.

Figure 2:
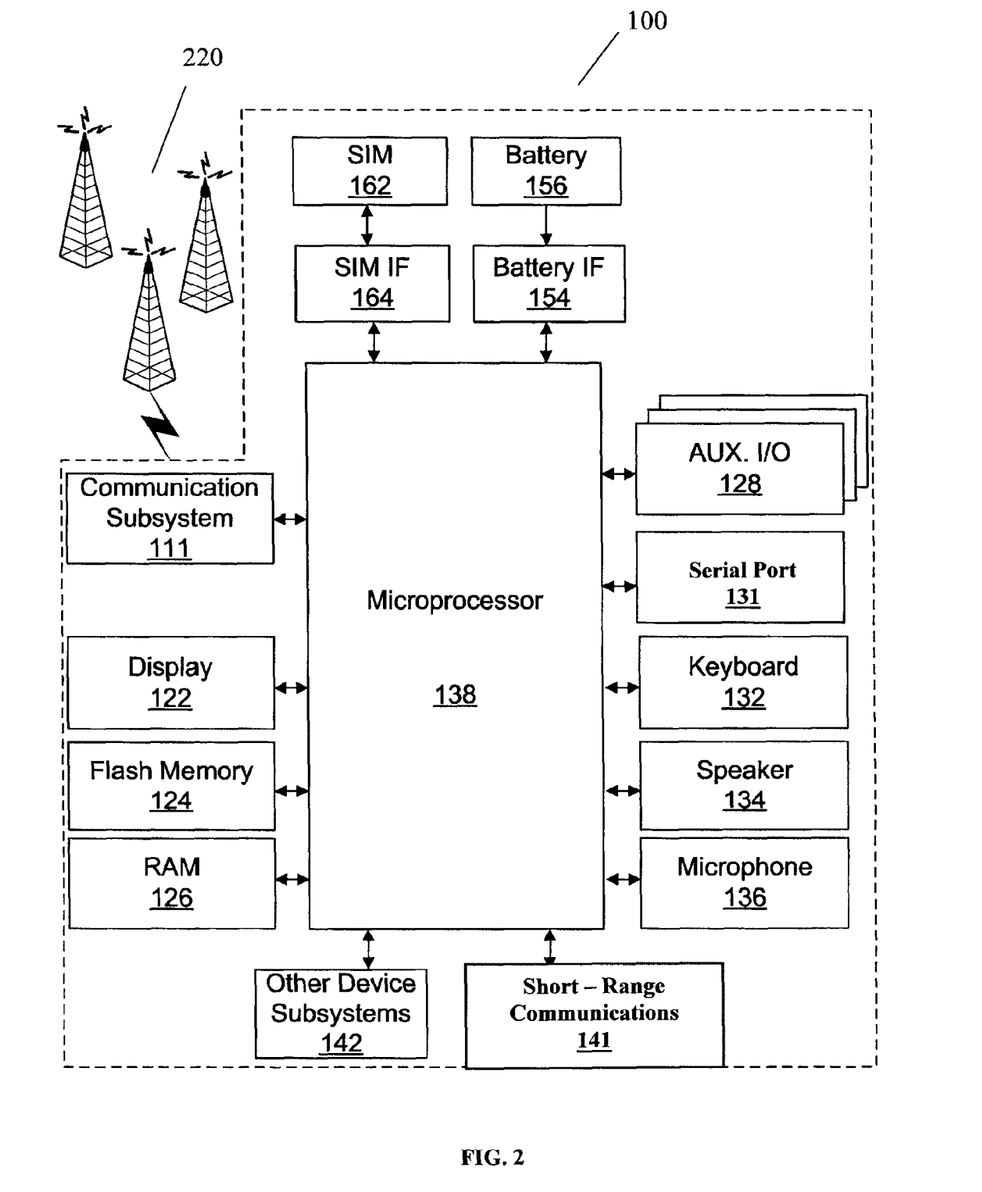
FIG. 2 is a block diagram illustrating the wireless device of FIG. 1.
Figure 4:
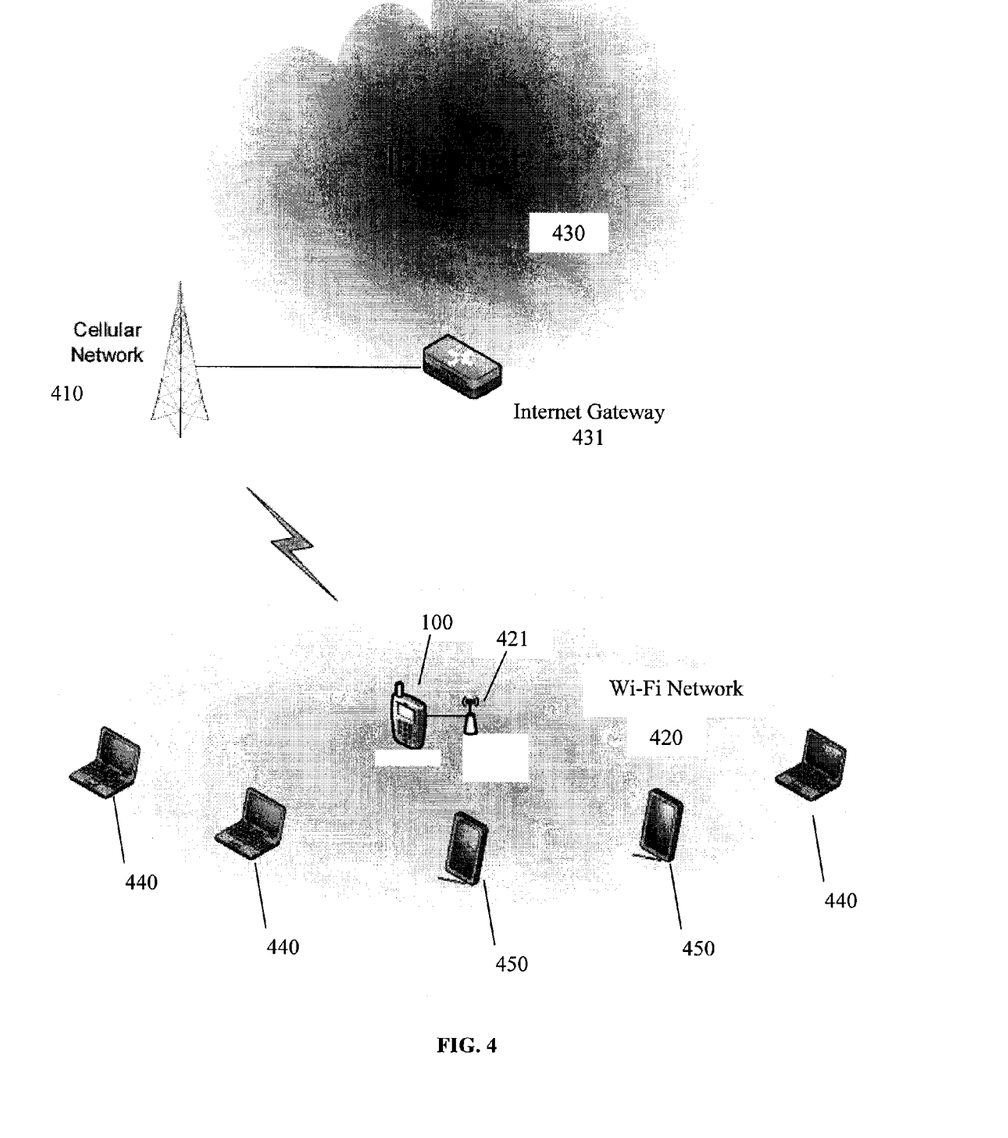
FIG. 4 is a block diagram illustrating a wireless device operating as a mobile hotspot in accordance with an embodiment of the application.

FIG. 2 is a block diagram illustrating the wireless device 100 of FIG. 1. The wireless device 100 may operate over a wireless network 220. The wireless network 220 may include antenna, base stations, access points, transceivers, supporting radio equipment (e.g., a GSM radio, a Wi-Fi radio 421 as shown in FIG. 4, etc.), etc., as known to those of ordinary skill in the art, for supporting wireless communications between the wireless device 100 and other devices (e.g., laptop computers 440, tablet computers 450, etc., as shown in FIG. 4). The wireless network 220 may include a cellular network (e.g., a global system for mobile communication ("GSM") network, a $3^{rd}$ generation partnership project ("3GPP") GSM network, a code division multiple access ("CDMA") network, etc.) 410 and a Wi-Fi network (i.e., a WLAN based on IEEE 802.11 standards) 420 as shown in FIG. 4.

The wireless device 100 may be a two-way communication device having at least voice and advanced data communication capabilities, including the capability to communicate with other devices. Depending on the functionality provided by the device 100, it may be referred to as a data messaging device, a two-way pager, a cellular telephone with data messaging capabilities, a wireless Internet appliance, a data communication device (with or without telephony capabilities), a Wi-Fi device, a WLAN device, a dual-mode (i.e., Wi-Fi and cellular) device, a portable audio device, or a mobile hotspot device. The device 100 may communicate with any one of a plurality of transceiver stations within its geographic coverage area.

The wireless device 100 may have a communication subsystem 111, a subscriber identity module (or "SIM" card) 162 for inserting into a SIM interface ("IF") 164 in order to operate on a cellular network (e.g., a global system for mobile communication ("GSM") network, a $3^{rd}$ generation partnership project ("3GPP") GSM network, etc.), a battery IF 154 for receiving one or more rechargeable batteries 156, a microprocessor 138 which controls overall operation of the device 100, a flash memory 124 or other persistent store, a random access memory ("RAM") 126, auxiliary input/output ("I/O") subsystems 128, a serial port (e.g., a universal serial bus ("USB") port) 131, a microphone 136, a short-range communications subsystem 141, and other device subsystems 142. The microprocessor 138, in addition to performing operating system functions, preferably enables execution of software applications on the device 100.

Figure 3:
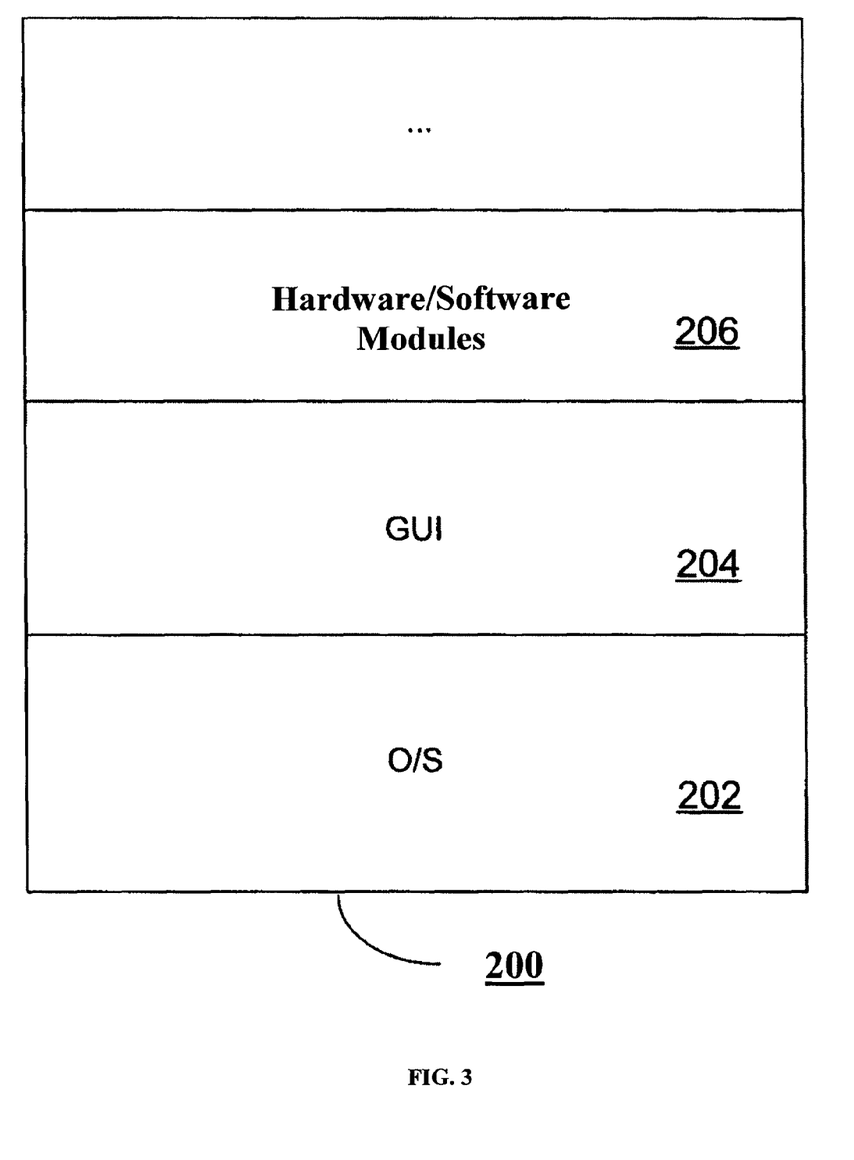
FIG. 3 is a block diagram illustrating a memory of the wireless device of FIG. 1.

FIG. 3 is a block diagram illustrating a memory 200 of the wireless device 100 of FIG. 1. The microprocessor 138 is coupled to the memory 200. The memory 200 has various hardware and software components for storing information (e.g., instructions, data, database tables, test parameters, etc.) for enabling operation of the device 100 and may include flash memory 124, RAM 126, ROM (e.g., 200), disk drives (e.g., 200), etc. In general, the memory 200 may include a variety of storage devices typically arranged in a hierarchy of storage as understood to those skilled in the art. To provide a user-friendly environment to control the operation of the device 100, operating system ("O/S") software modules 202 resident on the device 100 may provide a basic set of operations for supporting various applications typically operable through the GUI 180 and supporting GUI software modules 204. For example, the O/S 202 provides basic input/output system features to obtain input from the auxiliary I/O 128, the keyboard 132, the trackball or thumbwheel 110, and the like, and for facilitating output to the user through the display 122, the speaker 134, etc. According to one example embodiment, the wireless device 100 is provided with hardware and/or software modules 206 for facilitating and implementing the method of the application as will be described below. The wireless device 100 may be provided with additional hardware and/or software modules 206 for facilitating and implementing various functions (e.g., a mobile hotspot function 206 as described below).

A user may interact with the wireless device 100 and its various modules 202, 204, 206, using the GUI 180. GUIs are supported by common operating systems and provide a display format which enables a user to choose commands, execute application programs, manage computer files, and perform other functions by selecting pictorial representations known as icons, or items from a menu through use of an input or pointing device such as a trackball or thumbwheel 110 and keyboard 132. The GUI 180 may include a cursor 190, various selectable objects and icons 191, and various windows 192.

In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 122 by using an input or pointing device (e.g., trackball or thumbwheel) 110 to position a pointer or cursor 190 over an object (e.g., an icon) 191 and by "clicking" on the object 191.

Typically, a GUI based system presents application, system status, and other information to the user in "windows" appearing on the display 122. A window 192 is a more or less rectangular area within the display 122 in which a user may view an application or a document. Such a window 192 may be open, closed, displayed full screen, reduced to an icon, increased or reduced in size, or moved to different areas of the display 122. Multiple windows may be displayed simultaneously, such as: windows included within other windows, windows overlapping other windows, or windows tiled within the display area.

Thus, the wireless device 100 includes computer executable programmed instructions for directing the device 100 to implement the example embodiments of the present application. The programmed instructions may be embodied in one or more hardware or software modules 206 which may be resident in the memory 200 of the wireless device 100 or elsewhere. Alternatively, the programmed instructions may be embodied on a computer readable medium or product (such as a CD disk or floppy disk) which may be used for transporting the programmed instructions to the memory 200 of the wireless device 100. Alternatively, the programmed instructions may be embedded in a computer-readable signal or signal-bearing medium or product that may be uploaded to a network 220 by a vendor or supplier of the programmed instructions, and this signal or signal-bearing medium or product may be downloaded through an interface 111, 131, 141 to the wireless device 100 from the network 220 by end users or potential buyers.

FIG. 4 is a block diagram illustrating a wireless device 100 operating as a mobile hotspot 100 in accordance with an embodiment of the application. In general, a hotspot is a site that offers Internet access over a wireless local area network ("WLAN") through the use of a router connected to a link to the Internet. Hotspots typically use Wi-Fi technology (i.e., WLAN technology based on IEEE 802.11 standards). Referring to FIG. 4, a mobile hotspot is a device 100, or a module or function 206 within a wireless device 100, that is used to create a hotspot that is linked (e.g., via an Internet gateway 431) to the Internet 430 via a cellular network (e.g., CDMA, 3GPP, etc.) 410. The mobile hotspot is mobile in that in can be used to establish a hotspot anywhere within the service area of the cellular network 410. Wireless devices (or clients) 440, 450 such as laptop computers, tablet computers, etc., are coupled to the mobile hotspot 100 via a WLAN such as a Wi-Fi network 420 which in turn is coupled to the Internet 430 via a cellular network 410. As such, clients 440, 450 are able to access the Internet 430 via the mobile hotspot 100 and cellular network 410.

As mentioned above, one problem with current wireless devices pertains to their operation as mobile hotspots. When a wireless device 100 is operating as a mobile hotspot 100, the end-to-end connectivity over the two radio technologies (e.g., Wi-Fi and CDMA, Wi-Fi and 3GPP, etc.) bridged by the mobile hot-spot 100 may need to be monitored in order to display an indication to the user of the wireless device 100 or manage the operation of the mobile hotspot function 206. Since the two radio technologies are separate, it is often cumbersome and inaccurate to monitor both radio systems simultaneously to determine whether the mobile hotspot function 206 is idle or in use.

Figure 5:
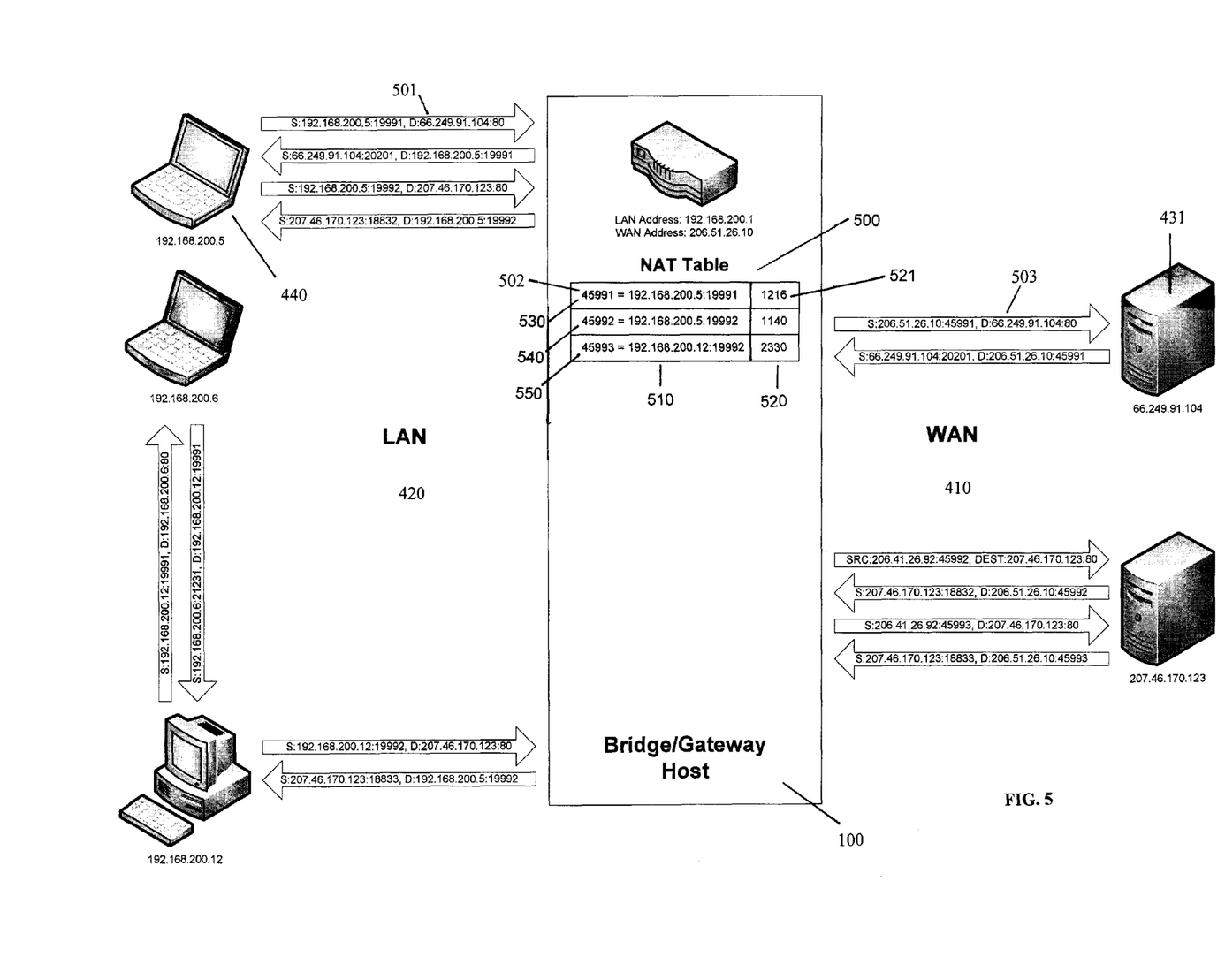
FIG. 5 is a block diagram illustrating a network address translation table in accordance with an embodiment of the application; and, FIG. 6 is a flow chart illustrating operations of modules within the memory of a wireless device for monitoring use of a mobile hotspot function, in accordance with an example embodiment of the application.

FIG. 5 is a block diagram illustrating a network address translation table 500 in accordance with an embodiment of the application. Since the Internet Protocol ("IP") address space on the Wi-Fi 420 side of the mobile hotspot 100 will be different from that on the cellular 410 side, address translation is required to map one set of addresses to the other.

According to one embodiment, the wireless device 100 maintains a mapping table or network address translation ("NAT") table 500 to translate WLAN IP addresses to cellular IP addresses to support the mobile hotspot function 206. The NAT table 500 may be stored in the memory 200 of the wireless device 100.

In general, an IP address is a numerical label that is assigned to any device (e.g., 440, 431) that is connected to a network (e.g., 420, 410) that follows the Internet Protocol for communications. The Internet Protocol is used to route data packets between networks. IP addresses specify the locations of the source and destination nodes in the topology of the routing system (e.g., 100).

For example, and referring to FIG. 5, a first device 440 on the Wi-Fi (or local area network ("LAN")) 420 side of the mobile hotspot (or router or bridge/gateway host) 100 may have an IP address of 192.168.200.5. The first device 440 may send a data packet to a second device 431 on the cellular (or wide area network ("WAN")) 410 side of the mobile hotspot 100. This second device 431 may have an IP address of 66.249.91.104. The mobile hotspot 100 may have a local area network ("LAN") address of 192.168.200.1 and a wide area network ("WAN") address of 206.51.26.10. First, the first device 440 sends 501 a packet having a source ("S") address of 192.168.200.5:19991 (i.e., 19991 being the source port) and a destination ("D") address of 66.249.91.104:80 (i.e., 80 being the requested destination port) to the mobile hotspot 100. Second, the mobile hotspot 100 uses the NAT table 500 (i.e., the first row 530 in the table 500) to map 502 the source address 192.168.200.5:19991 to port 45991 (i.e., 45991=192.168.200.5:19991). The mobile hotspot 100 completes the address translation by replacing the source ("S") address (i.e., 192.168.200.5) with the WAN address of the mobile hotspot 100 (i.e., 206.51.26.10). Third, the mobile hotspot 100 sends 503 the packet with the translated IP address (i.e., now having a source ("S") address of 206.51.26.10:45991 and retaining the destination ("D") address of 66.249.91.104:80) to the second device 431.

According to one embodiment, the mobile device 100 indicates to a user of the device 100 when the mobile hotspot function 206 is being used. This indication may be presented to the user on the display 122 of the wire device 100. The device 100 may generate the indication based upon an entry in the mapping table 500 as described below. The indication may be an icon 191 presented on the display 122.

According to one embodiment, the mapping table 500 may be used to generate an indication of end-to-end connectivity between devices (e.g., 420, 431) on the Wi-Fi 420 and cellular 410 sides of the mobile hotspot 100 and hence an indication that the mobile hotspot function 206 is in use. In this respect the mapping table 500 may include both a mapping column 510 and an additional column 520 in its data structure for the connection mapping. According to one embodiment, this additional column 520 may be a "last access time" column 520. For each row (e.g., 530) in the table 500, if the difference between the "current time" (e.g., 1222 hours) and the "last access time" entry (e.g., "1216" hours 521 for row 530) exceeds a predetermined "last access time threshold" (e.g., 5 minutes), then that row 530 in the table 500 can be considered elapsed, and hence the row 530 can be removed from the table 500. No rows (e.g., 530, 540, 550) remaining in the mapping table 500 implies that there are no end-to-end connections and hence that the mobile hotspot function 206 is not in use. Upon determination that the mobile hotspot function 206 is not in use, a signal may be generated to perform a predetermined function (e.g., changing an icon 191 presented on the display 122, disabling a feature, etc.).

According to one embodiment, the last access time threshold may be selected based on the time required to download information (e.g., a page of information) from a web site by a device or client (e.g., 440) via the mobile hotspot function 206 of the wireless device 100. According to another embodiment, the last access time threshold may be selected based on the last use of a service (e.g., cellular telephone service) by the wireless device 100. In this embodiment, the last access time threshold may be a number of minutes (e.g., 2 to 5 minutes) corresponding to the last time that the wireless device 100 was used to make a cellular telephone call. In this way, the possibility that the wireless device 100 may make only one cellular connection at a time is accommodated. According to another embodiment, the last access time threshold may be set to the last use of a selected service by the wireless device 100 or client 440.

The above embodiments may contribute to an improved method and system for monitoring use of a mobile hotspot function 206 in a wireless device 100 and may provide one or more advantages. First, an indication that the mobile hotspot function 206 is in use may be advantageous in that the use of the function 206 may be associated with a different service or cost level. Second, use of the mobile hotspot function 206 may prevent use of another function of the wireless device 100 and hence an indication that the mobile hotspot function 206 is in use may be advantageous.

Figure 6:
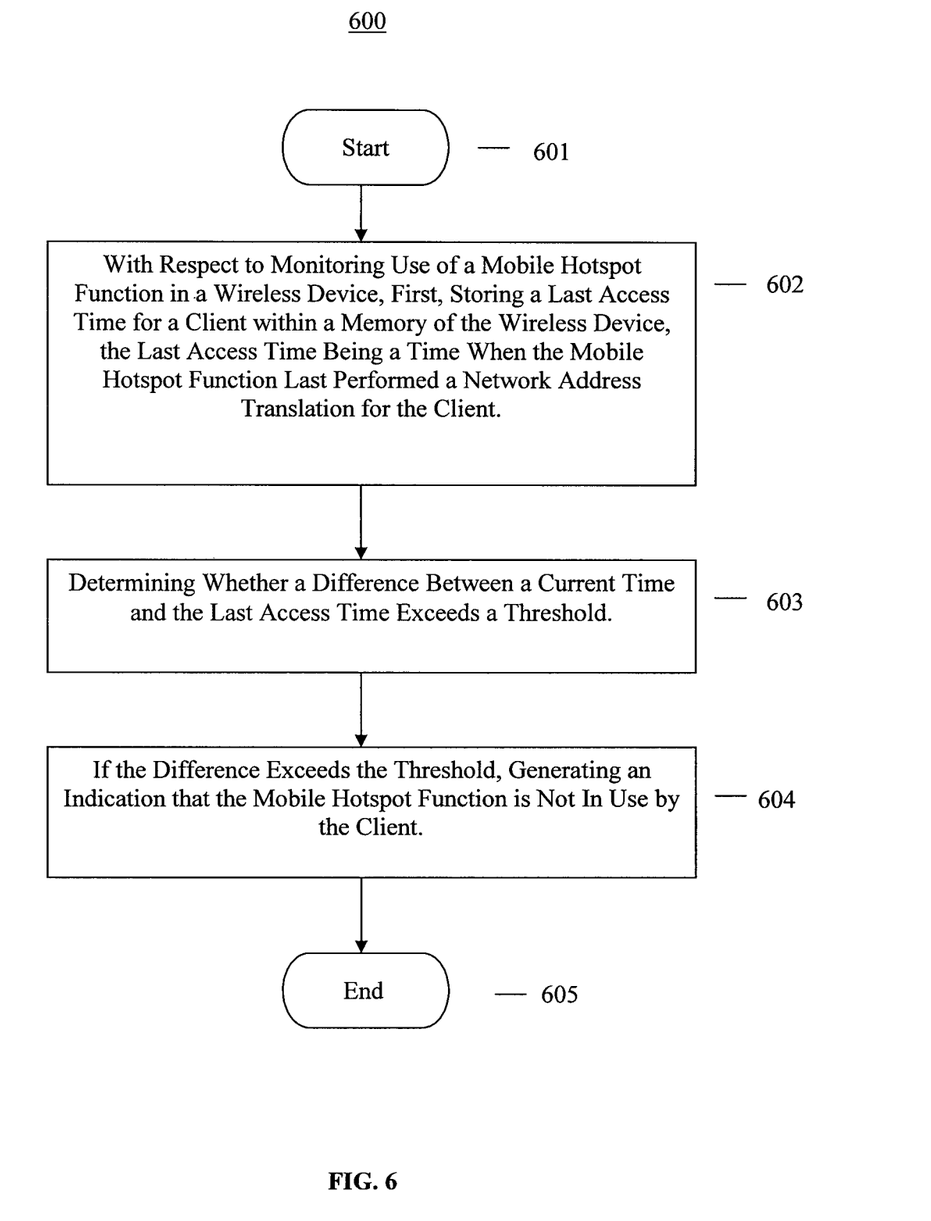

Aspects of the above described method may be illustrated with the aid of a flowchart. FIG. 6 is a flow chart illustrating operations 600 of modules 206 within the memory 200 of a wireless device 100 for monitoring use of a mobile hotspot function 206, in accordance with an example embodiment of the application.

At step 601, the operations 600 start.

At step 602, a last access time (e.g., "1216" hrs) for a client (e.g., 440) is stored within a memory 200 of the wireless device 100, the last access time being a time when the mobile hotspot function 206 last performed a network address translation for the client 440.

At step 603, a determination is made as to whether a difference between a current time (e.g., 1222 hours) and the last access time (e.g., 1216 hours) exceeds a threshold (e.g., 5 minutes).

At step 604, if the difference (e.g., 1222 hours–1216 hours=6 minutes) exceeds the threshold (e.g. 5 minutes), an indication (e.g., 191) that the mobile hotspot function 206 is not in use by the client 440 is generated.

At step 605, the operations 600 end.

In the above method, the last access time (e.g., "1216" hrs) may be stored as an entry (e.g., 521) in a row (e.g., 530) for the client 440 in a network address translation table 500 within the memory 220 of the wireless device 100 and the last access time (e.g., "1216" hrs) may be a time when the row 530 was last accessed by the mobile hotspot function 206 to perform the network address translation for the client 440. The method may further include presenting the indication 191 on a display 122 of the wireless device 100. The indication may be an icon 191. The client 440 may be coupled to the wireless device 100 by a first network 420. The first network 420 may be a wireless local area network ("WLAN"). The WLAN 420 may be a Wi-Fi network. The wireless device 100 may be coupled by a second network 410 to a third network 430. The second network 410 may be a cellular network and the third network 430 may be the Internet. The threshold may be a time period required to download a selection of information from a web site by the client 440 via the mobile hotspot function 206. And, the threshold may be a time period corresponding to a last use of a selected service (e.g., cellular telephone service) by the wireless device 100 or client 440.

The above described method is generally performed by a wireless device 100. However, according to one example embodiment, the method can be performed by any other data processing system 100 such as a personal computer ("PC"), server, laptop computer, etc.

While example embodiments of this application are primarily discussed as a method, a person of ordinary skill in the art will understand that the apparatus discussed above with reference to a wireless device 100 and a data processing system, may be programmed to enable the practice of the method of these example embodiments. Moreover, an article of manufacture or product for use with a wireless device 100 or data processing system, such as a pre-recorded storage device or other similar computer readable medium or product including program instructions recorded thereon, may direct the wireless device 100 or data processing system to facilitate the practice of the method of these example embodiments. It is understood that such apparatus, products, and articles of manufacture also come within the scope of the application.

The embodiments of the application described above are intended to be exemplary only. Those skilled in this art will understand that various modifications of detail may be made to these embodiments, all of which come within the scope of the application.

What is claimed is:

1. A method for monitoring use of a mobile hotspot function in a wireless device, comprising:
    storing in a data structure stored in a memory of the wireless device an entry relating to a network address translation for a client with a last access time associated with the network address translation for the client, the last access time being a time when the mobile hotspot function last performed the network address translation for the client;
    removing the entry from the data structure when a difference between a current time and the last access time exceeds a threshold; and,
    when the data structure is empty, generating an indication that the mobile hotspot function is not in use by the client.

2. The method of claim 1 and further comprising presenting the indication on a display of the wireless device.

3. The method of claim 2 wherein the indication is an icon.

4. The method of claim 1 wherein:
    the client is coupled to a first network; and
    the data structure is a table.

5. The method of claim 4 wherein the first network is a wireless local area network ("WLAN").

6. The method of claim 5 wherein the WLAN is a Wi-Fi network.

7. The method of claim 1 wherein the wireless device is coupled by a second network to a third network.

8. The method of claim 7 wherein the second network is a cellular network and the third network is the Internet.

9. The method of claim 1 wherein the threshold is a time period required to download a selection of information from a web site by the client via the mobile hotspot function.

10. The method of claim 1 wherein the threshold is a time period corresponding to a last use of a selected service by the wireless device or client.

11. A system for monitoring use of a mobile hotspot function, comprising:
    a processor coupled to memory and a display; and,
    at least one of hardware and software modules within the memory and controlled or executed by the processor, the modules including:
    a module for storing in the memory a data structure containing an entry relating to a network address translation for a client with a last access time associated with the network address translation for the client, the last access time being a time when the mobile hotspot function last performed the network address translation for the client;
    a module for determining whether a difference between a current time and the last access time exceeds a threshold;
    a module for, if the difference exceeds the threshold, removing the entry from the data structure; and
    a module for, when the data structure is empty, generating an indication that the mobile hotspot function is not in use by the client.

12. The system of claim 11 and further comprising a module for presenting the indication on the display.

13. The system of claim 12 wherein the indication is an icon.

14. The system of claim 11 wherein:
    the client is coupled to the system by a first network; and
    the data structure is a table.

15. The system of claim 14 wherein the first network is a wireless local area network ("WLAN").

16. The system of claim 15 wherein the WLAN is a Wi-Fi network.

17. The system of claim 11 wherein the system is coupled by a second network to a third network.

18. The system of claim 17 wherein the second network is a cellular network and the third network is the Internet.

19. The system of claim 11 wherein the threshold is a time period required to download a selection of information from a web site by the client via the mobile hotspot function.

20. The system of claim 11 wherein the threshold is a time period corresponding to a last use of a selected service by the system or client.

21. A method for monitoring use of a mobile hotspot function in a wireless device, comprising:
    maintaining in a data structure stored in a memory of the wireless device entries relating to network address translations for a client with last access times associated with the network address translations, for each entry of the entries, its last access time being a time when the mobile hotspot function last performed its network address translation for the client;
    removing from the data structure any entry when a difference between a current time and its last access time exceeds a threshold; and,
    when the data structure is empty, generating an indication that the mobile hotspot function is not in use by the client.

22. The method of claim 21 wherein:
    the client is coupled to the wireless device by a wireless local area network ("WLAN"); and
    the data structure is a table.

* * * * *